United States Patent
Lv et al.

(10) Patent No.: US 10,450,689 B2
(45) Date of Patent: Oct. 22, 2019

(54) DUAL-STROKE SAFETY SWITCH OF WASHING MACHINE AND ECCENTRICITY CONTROL METHOD

(71) Applicant: QINGDAO HAIER WASHING MACHINE CO., LTD., Qingdao, Shandong (CN)

(72) Inventors: Peishi Lv, Shandong (CN); Gangjin Zhang, Shandong (CN); Yun Tian, Shandong (CN); Shunji Imai, Shandong (CN); Qi Zhang, Shandong (CN)

(73) Assignee: QINGDAO HAIER WASHING MACHINE CO., LTD., Shandong (CN)

( * ) Notice: Subject to any disclaimer, the term of this patent is extended or adjusted under 35 U.S.C. 154(b) by 165 days.

(21) Appl. No.: 15/545,128

(22) PCT Filed: Jul. 3, 2015

(86) PCT No.: PCT/CN2015/083307
§ 371 (c)(1),
(2) Date: Jul. 20, 2017

(87) PCT Pub. No.: WO2016/115838
PCT Pub. Date: Jul. 28, 2016

(65) Prior Publication Data
US 2018/0023235 A1    Jan. 25, 2018

(30) Foreign Application Priority Data

Jan. 23, 2015 (CN) .......................... 2015 1 0035925

(51) Int. Cl.
*D06F 37/20* (2006.01)
*D06F 33/02* (2006.01)
(Continued)

(52) U.S. Cl.
CPC ............ *D06F 37/203* (2013.01); *D06F 33/02* (2013.01); *G05B 9/02* (2013.01); *H01H 35/02* (2013.01);
(Continued)

(58) Field of Classification Search
CPC ....... D06F 37/203; D06F 37/42; H01H 35/02; H01H 2231/012
(Continued)

(56) References Cited

U.S. PATENT DOCUMENTS

| | | | |
|---|---|---|---|
| 5,690,206 A * | 11/1997 | Carroll, Jr. .............. | D06F 37/42 192/136 |
| 6,750,406 B2 * | 6/2004 | Komatsu ................ | H01H 21/22 200/1 B |
| 2008/0223698 A1 * | 9/2008 | Poyner ................ | H01H 27/002 200/61.76 |

FOREIGN PATENT DOCUMENTS

| CN | 201966080 U | 9/2011 |
|---|---|---|
| CN | 202258857 U | 5/2012 |

(Continued)

OTHER PUBLICATIONS

International Search Report (PCT/ISA/210) dated Oct. 29, 2015, by the State Intellectual Property Office of the P.R. China as the International Searching Authority for International Application No. PCT/CN2015/083307.
(Continued)

*Primary Examiner* — Edwin A. Leon
*Assistant Examiner* — Iman Malakooti
(74) *Attorney, Agent, or Firm* — Buchanan Ingersoll & Rooney PC

(57) ABSTRACT

A dual-stroke safety switch of a washing machine has a control switch mounted in a base, and a control rod movably connected to the base. The control switch comprises a first
(Continued)

control switch and a second switch. The control rod has two motion strokes respectively for controlling the switch-off of the first control switch and the second switch, and the motion stroke for the switch-off of the first control switch is less than the motion stroke for the switch-off of the second control switch. The different strokes of the control rod substantially reflect different degrees of eccentricity of a water tub. The switch-off of the first control switch indicates that small eccentricity of the water tub takes place, and the switch-off of the second control switch indicates that there is serious eccentricity.

15 Claims, 4 Drawing Sheets

(51) Int. Cl.
    *G05B 9/02*     (2006.01)
    *H01H 35/02*     (2006.01)
    *D06F 37/42*     (2006.01)

(52) U.S. Cl.
    CPC .......... *D06F 37/42* (2013.01); *D06F 2222/00* (2013.01); *D06F 2232/08* (2013.01); *H01H 2231/012* (2013.01); *H01H 2235/01* (2013.01); *H01H 2300/024* (2013.01)

(58) Field of Classification Search
    USPC ...................................................... 200/61.76
    See application file for complete search history.

(56) References Cited

FOREIGN PATENT DOCUMENTS

| JP | H 01-135392 A | 5/1989 | |
|---|---|---|---|
| JP | H 10-057676 A | 3/1998 | |
| JP | 3091550 * | 9/2000 | ............ D06F 37/24 |
| JP | 3091550 B2 | 9/2000 | |
| JP | 2004-033682 A | 2/2004 | |

OTHER PUBLICATIONS

Written Opinion (PCT/ISA/237) dated Oct. 29, 2015, by the State Intellectual Property Office of the P.R. China as the International Searching Authority for International Application No. PCT/CN2015/083307.

* cited by examiner

DUAL-STROKE SAFETY SWITCH OF WASHING MACHINE AND ECCENTRICITY CONTROL METHOD

FIELD OF THE INVENTION

The present disclosure relates to a technical field of washing machine, particularly, to a dual-stroke safety switch of a washing machine and an eccentricity control method of a washing machine.

BACKGROUND OF THE INVENTION

During the start of the dewatering process of a washing machine, if the laundry is seriously uneven distributed, the inner tub will have a severe eccentricity during the rotation. Thus, it results in producing a larger parallel amplitude, the outer tub hits the shell and the whole washing machine shifts when the amplitude is big enough. Therefore, during the start of the dewatering process of the washing machine, if the laundry is seriously uneven distributed, a safety switch is arranged under the disc seat of the washing machine to prevent the outer tub from severely hitting the shell. The traditional safety switch of the washing machine generally has only one micro switch with only one switch action. When the outer tub is a larger eccentricity during rotation, the outer tub will hit the safety switch, so that the washing machine is suspended, and then to restart the dewatering process. Or, other means such as using the operation of the pulsator to adjust the distribution of loads, or compensation for part of the water for short time washing and balancing loads distribution are adopted. However, the above-mentioned adjustment methods cannot be timely and effectively control of the dewatering operation, they can only adjust by suspending the dewatering process and the rotation speed abruptly change in dewatering, so it comes along with problems such as water, power, time consumption issues. And it is not avoided causing severely vibration and big noise of the washing machine Therefore, how to effectively control the operation state of dewatering process of the washing and timely to take actions to correct, and to avoid severely vibration and big noise of the washing machine has become technical problems need to be solved urgently.

SUMMARY OF THE INVENTION

In order to solve the problem mentioned above, a first object of the present disclosure is to provide a dual motion stroke safety switch which is able to control the automatic washing machine to start dewatering process stably and reduce vibration.

A dual-stroke safety switch of a washing machine is provided of the present disclosure, specifically, a technical scheme is adopted as follows:

A dual-stroke safety switch of a washing machine, comprises a control rod, a base and a control switch, the control switch is mounted in the base, the control rod is movably connected to the base. The control switch comprises a first control switch and a second control switch, the control rod has two motion strokes respectively for controlling the switch-off of the first control switch and the second control switch. A motion stroke of the control rod for switching off the first control switch is smaller than a motion stroke of the control rod for switching off the second control switch.

Further, the first control switch and the second control switch are mounted side by side in the base, the first control switch is arranged beside of the second control switch. The first control switch is switched off when a displacement stoke of a water tub is 8 to 18 mm, the second control switch is switched off when the displacement stroke of the water tub is larger than or equal to 18 mm.

Further, a middle part of the control rod is rotatably connected to the base, one end of the control rod is provided between the water tub and the shell of the washing machine for bearing an eccentric hit from the water tub. Another end of the control rod is in contact with the first control switch and the second control switch for simultaneously switching on the first control switch and the second control switch in a natural state, and switches off the first control switch and/or the second control switch in the eccentricity state of the water tub.

Further, the first control switch and the second control switch are mounted side by side in the base and are both mounted under an end of the control rod close to the base, the first control switch is arranged close to said end of the control rod. The first control switch and the second control switch are simultaneously switched on in the natural state, and only the first control switch is switched off or both the first control switch and the second control switch are switched off when the water tub is in the eccentricity state.

Further, the first control switch and the second control switch are independently mounted side by side in the base, or the first control switch and the second control switch are integrated and mounted in the base. The first control switch has a first control button, the second control switch has a second control button, the first control button and the second control button are arranged side by side, and the first control button is arranged close to an end of the control rod.

Further, the control rod comprises a control rod head and a control rod seat, the control rod head is disposed between the water tub and the shell of the washing machine for bearing the eccentricity hit from the water tub. The control rod seat is in contact with the first control switch and the second control switch for simultaneously switching on the first control switch and the second control switch in the natural state, and for switches off the first control switch and/or the second control switch in the eccentricity state of the water tub.

Further, the control rod is set as "L" shape, a vertical part of the "L" shape is the control rod head and a horizontal part is the control rod seat. A connection part of the control rod head and the control rod seat is rotatably connected to the base through a rotating shaft. The first control switch and the second control switch are mounted side by side under the control rod seat and the first control switch is arranged close to an end of the control rod seat.

Further, a reset means for controlling the reset of the control rod is provided between the control rod and the base. Preferably, the reset means is an elastic torsion spring or an elastic tension spring.

A second object of the present disclosure is to provide an eccentricity control method for the washing machine with the dual-stroke safety switch, specifically, the following technical scheme is adopted:

An eccentricity detecting method of a washing machine is provided. During a dewatering process of the washing machine, the computer board determines a motion state of the safety switch. When the first control switch of the safety switch is switched off, the computer board controls the washing machine to decelerate dewatering or dewatering along with sprinkling for eccentricity correction. When the first control switch and the second control switch are both switched off, the computer board controls the washing machine to suspend dewatering and the washing machine supplies water for the eccentricity correction.

Further, the eccentricity detecting method of the washing machine of the present disclosure comprises the following steps:

S1: starting the dewatering process;

S2: the computer board determining whether the second control switch of the safety switch is switched off or not;

S3: if yes, executing S4, if not, executing S6;

S4: determining whether an operation number K of the second control switch satisfies K≤3;

S5: if yes, suspending dewatering and supplying water according to state of the washing machine, performing an eccentricity correction program for adjusting loads distribution and backing to step S1; if not, the washing machine stopping working and alerts;

S6: the computer board determining whether the second control switch is switched off;

S7: if yes, executing decelerating a dewatering rotation speed or executing sparkler dewatering for eccentricity correction and backing to S2; if not, the computer board accelerating the dewatering rotation speed for dewatering process according to the operation state.

The dual-stroke safety switch of the washing machine of the present disclosure comprises two control switches, the first control switch and the second control switch, and the first control switch and the second control switch are controlled by the same control rod. But strokes of the control rod corresponding to the first control switch and the second control switch for motion are different, and the motion stroke of the control rod corresponding to the second control switch is bigger. By the arrangement, the greater the degree of the eccentricity of the water tub is, the bigger the motion stroke of the control rod, because the motion stroke of the control rod is determined by the degree of the eccentricity of the water tub.

Therefore, the strokes for motion corresponding to the first control switch and the second control switch are different, which substantially reflects the different degrees of eccentricity of the water tub. The switch-off of the first control switch indicates that the water tub has an eccentricity, but the degree of the eccentricity is small, and the switch-off of the second control switch indicates that the water tub has a serious eccentricity. The dual-stroke safety switch of the present disclosure can effectively control the dewatering process of the washing machine at the start of the dewatering. If the eccentricity of the loads can be corrected by means in time, then the bigger vibration and loud noise of the washing machine can be avoided.

At the same time, the safety switches are connected into a control circuit of the washing machine which makes the first control switch and the second control switch correspond to different control programs. When the first control switch or the second control switch switches on or off, the control programs can determine the eccentricity state of the water tub and further take action to correct the eccentricity. For example, when the first control switch is switched off, it indicates that the water tub has an eccentricity but the degree of the eccentricity is small. So means like reducing the rotation speed of the dewatering or dewatering along with sprinkling is taken to re-distribute the loads to correct the eccentricity, thus it avoids the issues of the traditional method caused by abruptly changing the rotation speed in dewatering, such as the water consumption, power consumption, time consuming issues. When the second control switch is switched off, it indicates that the water tub of the washing machine has a serious eccentricity. The easy means like reducing the rotation speed of the dewatering or dewatering along with sprinkling is not easy or cannot achieve the correction of the eccentricity. At this point, it is needed to suspend the dewatering process and re-supply water to correct the eccentricity by adjusting loads distribution, then restart the dewatering process.

Therefore, the eccentricity correction method of the washing machine of the present disclosure can determine the eccentricity state of the water tub of the washing machine according to the motion state of the safety switch of the present disclosure and choose a more suitable eccentricity correction program according to the degree of the eccentricity. So, the eccentricity correction method of the present disclosure is more targeted and it can avoid issues like water consumption, power consumption and time consuming in the traditional eccentricity correction method to a certain degree.

Besides, the eccentricity correction method of the washing machine of the present disclosure provides protection over the safe and effective dewatering operation of the washing machine, which avoids the great vibration and loud noise from the startup or dewatering operation of the washing machine. The intelligent level of the washing machine is enhanced and people's best laundry experience is met.

Figure 1:
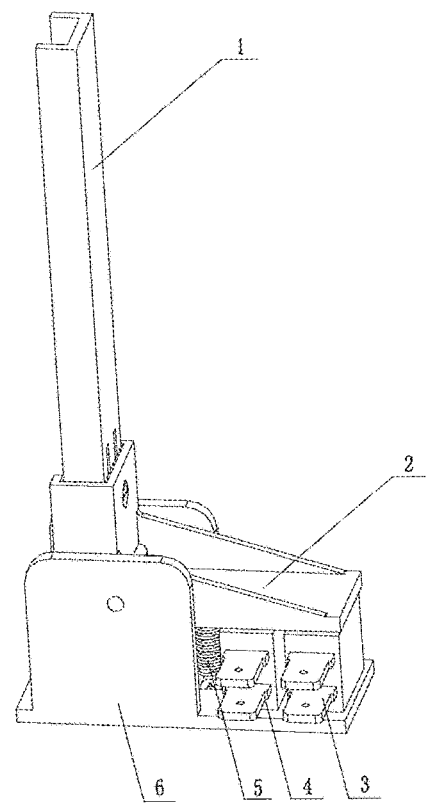
FIG. 1 is a schematic view of a three-dimensional structure of a dual-stroke safety switch of a washing machine of the present disclosure.

The description of the label in the drawings: 1—control rod head 2—control rod seat 3—first control switch 4—second control switch 5—reset means 6—base 301—first control button 401—second control button

DETAILED DESCRIPTION OF THE INVENTION

A dual-stroke safety switch of a washing machine and an eccentricity control method of the washing machine of the present disclosure are described in detail with accompanying drawings:

As shown in FIG. 1, FIG. 2, FIG. 3, FIG. 4, FIG. 5, FIG. 6, and FIG. 7, a dual-stroke safety switch of a washing machine comprises a control rod, a base 6 and control switch, the control switch is mounted in the base 6, and the control rod is movable connected to the base 6. The control switch comprises a first control switch 3 and a second control switch 4, the control rod has two motion strokes respectively for controlling the switch-off motion stroke of the first control switch 3 and the second control switch 4. A motion stroke of the control rod for switching off the first control switch 3 is smaller than a motion stroke of the control rod for switching off the second control switch 4.

The base 6 of the present disclosure is mainly used for mounting the first control switch 3 and the second control switch 4 and control rod, the base 6 is fixedly mounted on the disc seat which realizes the fixedly mounting of the dual-stroke safety switch of the present disclosure. The control rod of the present disclosure is mainly used for controlling the first control switch 3 and the second control switch 4, the first control switch 3 and the second control switch 4 are switched off by the operation of the control rod.

The dual-stroke safety switch of the washing machine of the present disclosure comprises two control switches, the first control switch 3 and the second control switch 4, and the first control switch 3 and the second control switch 4 are controlled by the same control rod. But strokes of the control rod corresponding to the first control switch 3 and the second control switch 4 for motion are different, the motion stroke of the control rod corresponding to the second control switch 4 is bigger. By the arrangement, the greater the degree of the eccentricity of the water tub is, the bigger the motion stroke of the control rod, because the motion stroke of the control rod is determined by the degree of the eccentricity of the water tub.

The water tub of the present disclosure is an outer tub of the washing machine for an automatic washing machine, a lower portion of the outer tub is mounted on the shell of the washing machine by means of a boom. During the dewatering, the serious eccentricity of the inner tub will cause the eccentric vibration of the outer tub. When the vibration amplitude is too large, a "bumping tubs" phenomenon will happen and cause damage to the washing machine.

Therefore, the strokes for motion corresponding to the first control switch 3 and the second control switch 4 are different, which substantially reflects the different degrees of eccentricity of the water tub. The switch-off of the first control switch 3 indicates that the water tub has an eccentricity, but the degree of the eccentricity is small, and the switch-off of the second control switch 4 indicates that the water tub has a serious eccentricity. The dual-stroke safety switch of the present disclosure can effectively control the dewatering process of the washing machine at the start of the dewatering or operating of the dewatering. If the eccentricity of the loads can be corrected by means in time, then the bigger vibration and loud noise of the washing machine can be avoided.

As can be seen from the above, the switch-off of the first control switch 3 and the second control switch 4 of the present disclosure is achieved by the movement of the control rod. Therefore, the switch-off of the first control switch 3 and the second control switch 4 is determined by the stroke of the control rod. Preferably, the first control switch 3 and the second control switch 4 are micro switches. Micro switch is such kind of switch which has a small contact interval, a quick-moving mechanism, and a contact mechanism for performing a switching operation with a predetermined stroke and a predetermined force. The micro switch is covered by a shell with a drive rod outside. Because the contact interval of the switch is relatively small, hence the name is micro switch, also known as sensitive switch.

The eccentricity angles of the water tub of the washing machine corresponding to the switch-off of the first control switch 3 and the second control switch 4 of the present disclosure are different. As a preferred embodiment of the present disclosure, the present disclosure provides an eccentricity angle of the water tub of the washing machine corresponding to the first control switch 3 and the second control switch 4. Specifically, the first control switch 3 and the second control switch 4 are mounted side by side in the base 6, the first control switch 3 is arranged beside the second control switch 4. The first control switch 3 is switched off when a displacement stoke of a water tub is 8 to 18 mm, the second control switch 4 is switched off when the displacement stroke of the water tub is larger than or equal to 18 mm.

The displacement stroke of the water tub according to the present disclosure is a distance that the central axis of the water tub shifts away from the natural installation position during the dewatering process. The central axis is mainly the central axis of the upper portion of the water tub, further the central axis of the water tub lid can be selected, because the displacement stroke at this point is the largest. And the capacity of the washing machine determines the size of the displacement stroke of the water tub. The general situation is that, the greater the capacity of the washing machine is, the smaller the displacement stroke of the water tub during the dewatering process of the washing machine is allowed. That is, the allowed displacement stroke of the water tub during the dewatering process of the washing machine the bucket is inversely proportional to the capacity of the washing machine. Therefore, the distance of the displacement stroke of the water tub lib is adjusted according to the capacity of different washing machines. The motion points of the first control switch 3 and the second control switch 4 of the safety switch of the present disclosure are adjusted accordingly.

It is the key to the present disclosure how to control the first control switch 3 and the second control switch 4 by the control rod of the present disclosure and to enable the control rod to switch off the first control switch 3 when the eccentricity of the water tub is not too serious, and switch off the second control switch 4 when the eccentricity is serious. As a preferred embodiment of the present disclosure, a middle part of the control rod is rotatably connected to the base 6, one end of the control rod is provided between the water tub and the shell of the washing machine for bearing an eccentric hit from the water tub. Another end of the control rod is in contact with the first control switch 3 and the second control switch 4 for simultaneously switching on the first control switch 3 and the second control switch 4 in a natural state and for switching off the first control switch 3 and/or the second control switch 4 in the eccentricity state of the water tub.

The control rod of the present disclosure operates in a manner similar to that of a "lever", and one end of the control rod is displaced by the eccentric pressure of the water tub, and at the same time, the other end of the control rod also displaces, switches on or off the first control switch 3, and the second control switch 4. Referring to the safety switch of the present disclosure, in the natural state, the control rod presses the first control switch 3 and the second control switch 4 to make them switch on. And in the eccentricity state, the displacement of one end of the control rod being subject to press determines how much the reverse displacement occurs at the other end according to the severity of the eccentricity, which further determines the switch-off of the first control switch 3 or the switch-off of the second control switch 4, or the switch-off of both the first control switch 3 and the second control switch 4.

Therefore, the number of the control rod of the present disclosure may be set two for switching on and off of the first control switch 3 and the second control switch 4, respectively. However, the control method for two control rods to control the first control switch 3 and the second control switch 4 is different. The present disclosure may be provided with only one control rod to control the switch-on and switch-off of the first control switch 3 and the second control switch 4, and in particular, the following technical scheme is adopted:

For the dual-stroke safety switch of the present disclosure, the first control switch 3 and the second control switch 4 are mounted side by side in the base and are both mounted under an end of the control rod close to the base 6, and the first control switch 3 is arranged close to said end of the control rod. The first control switch 3 and the second control switch 4 are simultaneously switch-on in the natural state, and only the first control switch 3 is switched off or both the first control switch 3 and the second control switch 4 are switched off when the water tub is in the eccentricity state.

The natural state described in the present disclosure is an initial state when the safety switch is mounted on the washing machine, that is, the state in which the safety switch is not subjected to eccentric pressure.

The first control switch 3 and the second control switch 4 of the present disclosure are controlled to be switched on and off by the same control rod, and the structure is more simple and easy to install. The displacement of the end of the control rod at different positions above the first control switch 3 and the second control switch 4 is different, the position nearer the end the displacement is bigger. Therefore, when the degree of the eccentricity of the water tub is small, the eccentric displacement of the control rod causes not to press the first control switch 3 and the first control switch 3 is switched off. But the displacement of the control rod is not big enough to reach the stroke on which the second control switch 4 is not pressed, so the second control switch 4 is still in the switch-on state. When the degree of the eccentricity of the water tub is bigger, the eccentric displacement of the control rod is greater. The first control switch 3 is switched off without the pressure from the control rod, and the second control switch 4 is switched off for the same reason.

Figure 2:
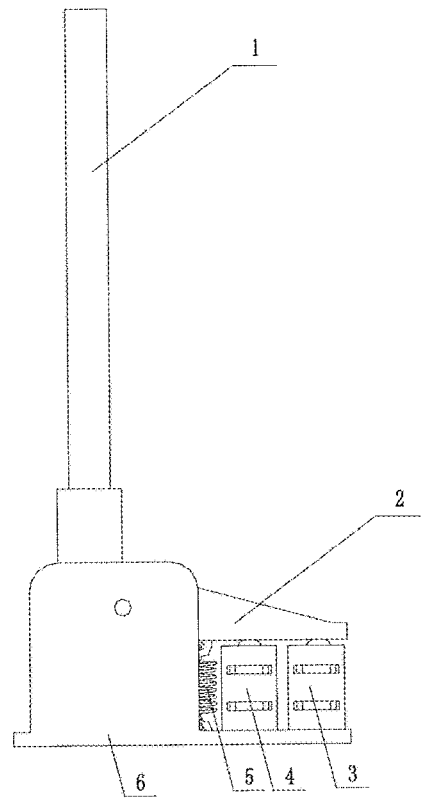
FIG. 2 is a front view of the dual-stroke safety switch of the washing machine of the present disclosure in a natural state.
Figure 3:
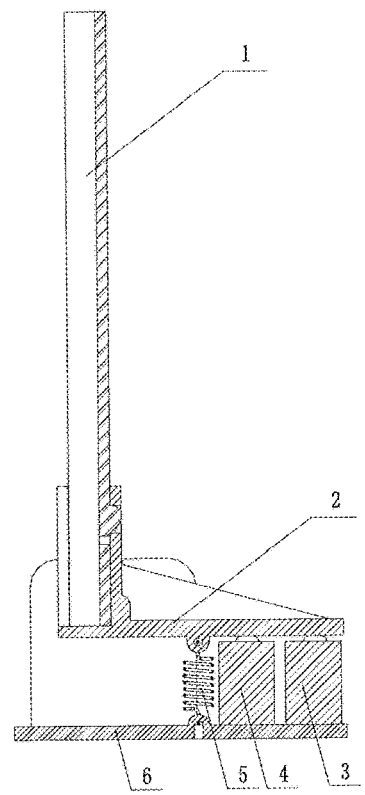
FIG. 3 is a cross-sectional view of the dual-stroke safety switch of the washing machine of the present disclosure in the natural state.
Figure 4:
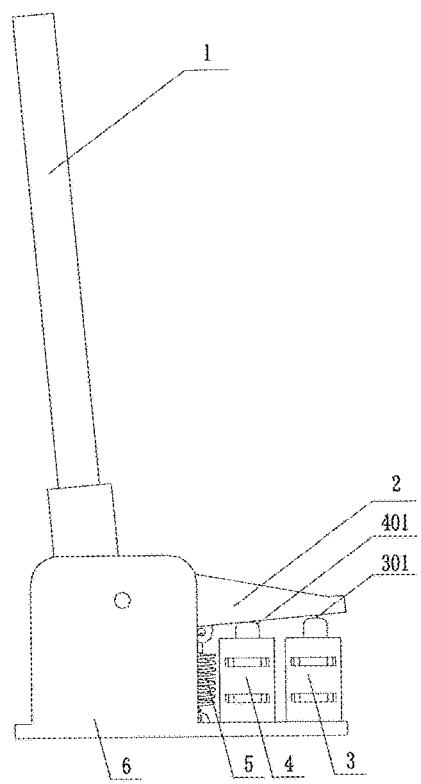
FIG. 4 is a front view of the first control switch of the dual-stroke safety switch of the washing machine of the present disclosure in a switch-off state.
Figure 5:
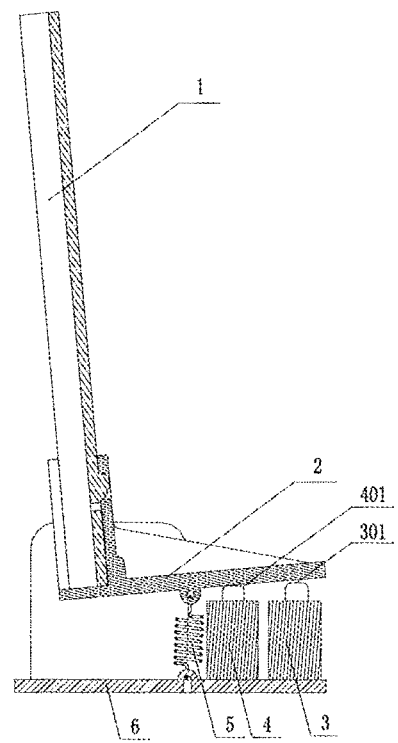
FIG. 5 is a cross-sectional view of the first control switch of the dual-stroke safety switch of the washing machine of the present disclosure in a switch-off state.
Figure 6:
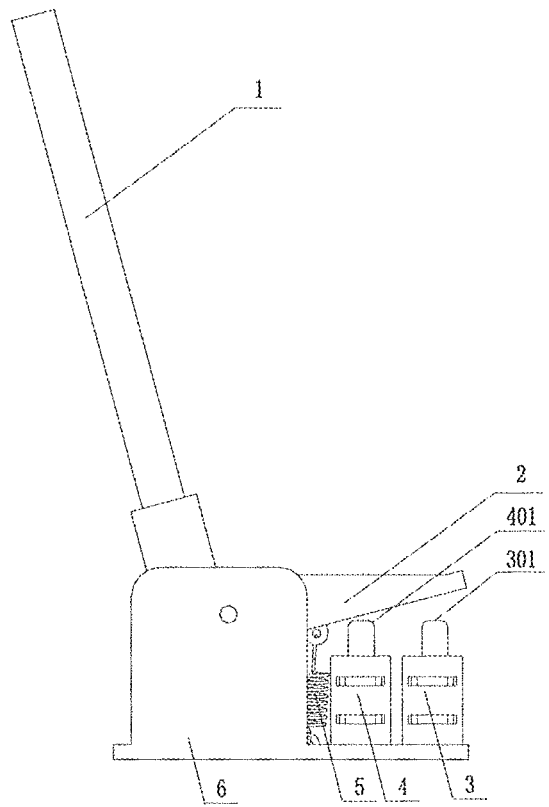
FIG. 6 is a front view of the second control switch of the dual-stroke safety switch of the washing machine of the present disclosure in a switch-off state.
Figure 7:
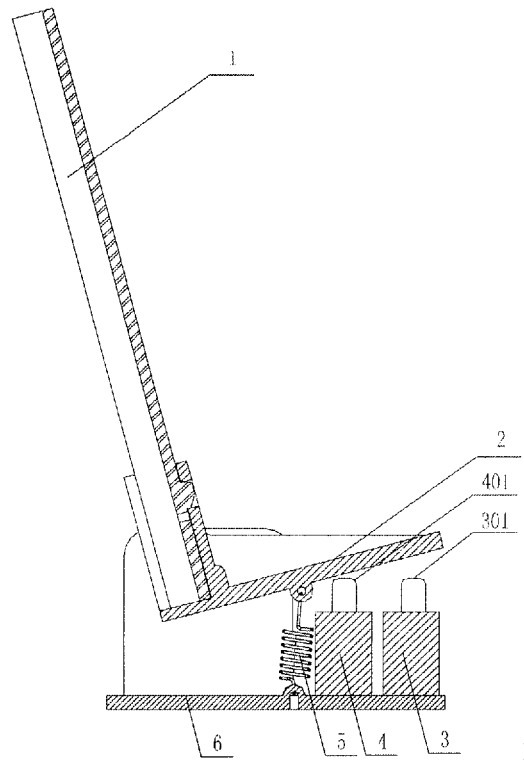
FIG. 7 is a cross-sectional view of the second control switch of the dual-stroke safety switch of the washing machine of the present disclosure in a switch-off state.

Therefore, for the safety switch of the present disclosure, as shown in FIG. 1, FIG. 2 and FIG. 3, in the natural state, the first control switch 3 and the second control switch 4 are both in the switch-on state under the pressure of the control rod. As shown in FIG. 4 and FIG. 5, when the eccentricity of the water tub is smaller, the first control switch 3 is switched off without pressure, and the second control switch 4 is still in switch-on state under the pressure of the control rod. As shown in FIG. 6 and FIG. 7, when the eccentricity of the water tub is serious, the first control switch 3 and the second control switch 4 are both not under the pressure of the control rod, and the two control switches are both in the switch-off state.

The installation positon of the control switch of the present disclosure determines the stroke of the control rod corresponding to the motion of the control switch. Therefore, as a preferred embodiment of the present disclosure, the first control switch 3 and the second control switch 4 are independently mounted side by side in the base 6, or the first control switch 3 and the second control switch 4 are integrated and mounted in the base 6. The first control switch 3 has a first control button, 301 the second control switch 4 has a second control button 401. The first control button 301 and the second control button 401 are arranged side by side, and the first control button 301 is arranged close to an end of the control rod.

In the present disclosure, the first control button 301 is arranged closer to the end of the control rod than the second control button 401. Because the end of the control rod has a larger displacement, the first control button 301 first get away from pressure when the control rod has the same eccentric displacement, so the first control switch 3 first gets switched off.

As a preferred embodiment of the present disclosure, the control rod comprises a control rod head 1 and a control rod seat 2, the control rod head 1 is disposed between the water tub and the shell of the washing machine for bearing the eccentricity hit from the water tub. The control rod seat 2 is in contact with the first control switch 3 and the second control switch 4 for simultaneously switching on the first control switch 3 and the second control switch 4 in the natural state and for switching off the first control switch 3 and/or the second control switch 4 in the eccentricity state of the water tub.

Specifically, the control rod is set as "L" shape, a vertical part of the "L" shape is the control rod head 1 and a horizontal part is the control rod seat 2. A connection part of the control rod head 1 and the control rod seat 2 is rotatably connected to the base 6 through a rotating shaft The first control switch 3 and the second control switch 4 are mounted side by side under the control rod seat 2 and the first control switch 3 is arranged close to an end of the control rod seat 2.

The first control switch 3 and the second control switch 4 should be in the switch-on state in the natural state, so when the washing machine normally operates without eccentricity, the control rod needs to be reset and put pressure on the first control switch 3 and the second control switch 4 to make them switch on. Therefore, a reset means 5 for controlling the reset of the control rod is provided between the control rod and the base 6. Preferably, the reset means 5 is an elastic torsion spring or an elastic tension spring.

In the present disclosure, the safety switches are connected into a control circuit of the washing machine, which makes the first control switch 3 and the second control switch 4 correspond to different control programs. When the first control switch 3 or the second control switch 4 switches on or off, the control programs can determine the eccentricity state of the water tub and further take action to correct the eccentricity.

The present disclosure is also provided with an eccentricity control method for the washing machine with the dual-stroke safety switch. During a dewatering process of the washing machine, the computer board determines a motion state of the safety switch. When the first control switch 3 of the safety switch is switched off, the computer board controls the washing machine to decelerate dewatering or dewatering along with sprinkling for eccentricity correction. When the first control switch 3 and the second control switch 4 are both switched off, the computer board controls the washing machine to suspend dewatering and the washing machine supplies water for the eccentricity correction.

In the eccentricity control method of the washing machine of the present disclosure, when the first control switch 3 is switched off, it indicates that the water tub has an eccentricity but the degree of the eccentricity is small. So means like reducing the rotation speed of the dewatering or dewatering along with sprinkling is taken to re-distribute the loads to correct the eccentricity, thus it avoids the issues of the traditional method caused by abruptly changing the rotation speed in dewatering, such as the water consumption, power consumption, time consuming issues. When the second control switch 4 is switched off, it indicates that the water tub of the washing machine has a serious eccentricity. The easy means like reducing the rotation speed of the dewatering or dewatering along with sprinkling is not easy to or cannot achieve the correction of the eccentricity. At this point, it is needed to suspend the dewatering process and re-supply water to correct the eccentricity by adjusting loads distribution, then restart the dewatering process.

Figure 8:
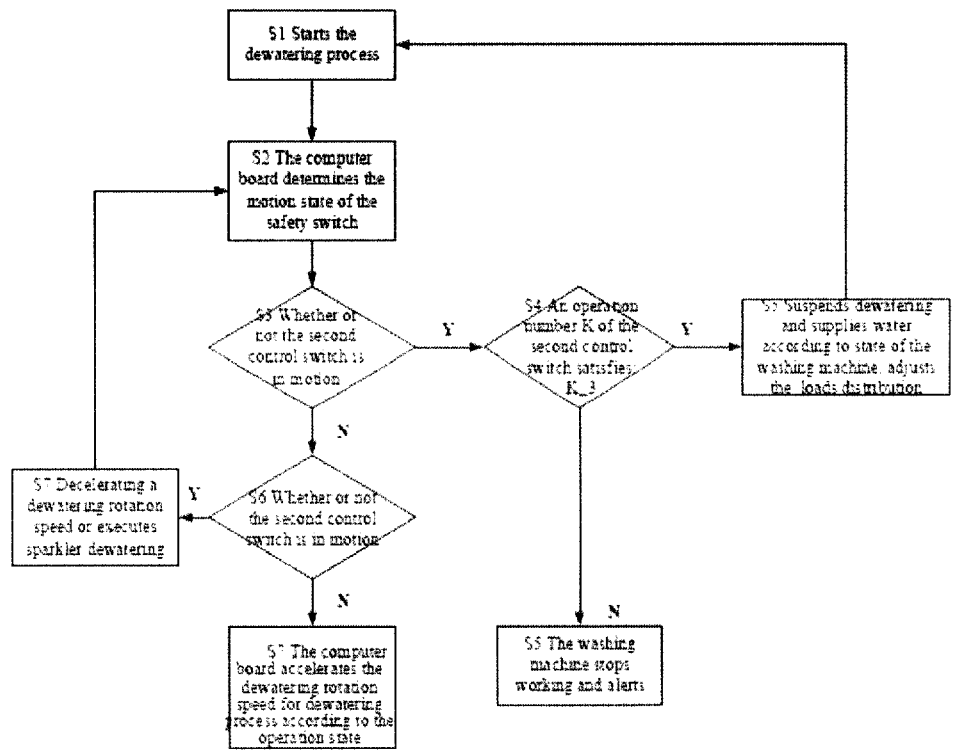
FIG. 8 is a flow chart of an eccentricity control method of the washing machine of the present disclosure.

As shown in FIG. 8, the eccentricity detecting method of the washing machine of the present disclosure comprises the following steps:

S1: starting the dewatering process;

S2: the computer board determining whether the second control switch of the safety switch is switched off or not;

S3: if yes, executing S4, if not, executing S6;

S4: determining whether an operation number K of the second control switch satisfies: $K \leq 3$;

S5: if yes, suspending dewatering and supplying water according to state of the washing machine, performing an eccentricity correction program for adjusting the loads distribution and backing to step S1; if not, the washing machine stopping working and alerting.

S6: the computer board determining whether the second control switch is switched off;

S7: if yes, executing decelerating a dewatering rotation speed or executing sparkler dewatering for eccentricity correction and backing to S2; if not, the computer board accelerating the dewatering rotation speed for dewatering process according to the operation state.

After receiving the alert in the step S5 in the eccentricity correction method of the present disclosure, users need to adjust the loads distribution by hands or to carry out maintenance work to overcome the eccentric condition.

Therefore, the eccentricity correction method of the washing machine of the present disclosure can determine the eccentricity state of the water tub of the washing machine according to the motion state of the safety switch of the present disclosure and choose a more suitable eccentricity correction program according to the degree of the eccentricity. So, the eccentricity correction method of the present disclosure is more targeted and it can avoid issues like water consumption, power consumption and time consuming in the traditional eccentricity correction method to a certain degree.

Besides, the eccentricity correction method of the washing machine of the present disclosure provides protection over the safe and effective dewatering operation of the washing machine, which avoids the great vibration and loud noise from the startup or dewatering operation of the washing machine. The intelligent level of the washing machine is enhanced and people's best laundry experience is met.

The foregoing is merely a preferred embodiment of the present invention and is not intended to be limiting of the present disclosure. While the present disclosure has been described with reference to the preferred embodiments, it is not intended to be limiting of the disclosure, and any person skilled in the art will, without departing from the scope of the technical solution of the present disclosure, may make a slight variation or modification as an equivalent embodiment of the equivalent of the technical contents of the above-mentioned tips. Any and all variation, equivalents, and modifications to the above embodiments are within the scope of the present disclosure without departing from the scope of the technical solution of the present disclosure in accordance with the technical details of the present invention.

The invention claimed is:

1. An eccentricity control method of a washing machine including a dual-stroke safety switch, the dual-stroke safety switch including a control rod, a base and a control switch, the control switch being mounted in the base, and the control rod being movably connected to the base, wherein, the control switch includes a first control switch and a second control switch, the control rod has two motion strokes respectively for controlling a switch-off of the first control switch and the second control switch, a motion stroke of the control rod for switching off the first control switch is smaller than a motion stroke of the control rod for switching off the second control switch, the method comprising:

when the first control switch of the dual-stroke safety switch is switched off, a controller controls the washing machine to decelerate dewatering or dewatering along with sprinkling for eccentricity correction during a dewatering process of the washing machine, when the first control switch and the second control switch are both switched off, the controller controls the washing machine to suspend dewatering and the washing machine supplies water for the eccentricity correction.

2. The eccentricity control method of the washing machine according to claim 1 comprising the following steps:

S1: starting the dewatering process;

S2: the controller determining whether the second control switch of the safety switch is switched off or not;

S3: if yes, executing S4, if not, executing S6;

S4: determining whether an operation number K of the second control switch satisfies: $K \leq 3$;

S5: if yes, suspending dewatering and supplying water according to state of the washing machine, performing an eccentricity correction program for adjusting loads distribution and backing to step S1; if not, the washing machine stopping working and alerting;

S6: the controller determining whether the second control switch is switched off;

S7: if yes, executing decelerating a dewatering rotation speed or executing sparkler dewatering for eccentricity correction and backing to S2; if not, the controller accelerating the dewatering rotation speed for dewatering process according to the operation state.

3. The eccentricity control method of the washing machine according to claim 1, wherein, the first control switch and the second control switch are mounted side by side in the base, the first control switch is arranged beside the second control switch, the first control switch is switched off when a displacement stroke of a water tub is in a range from 8 to 18 mm, and the second control switch is switched off when the displacement stroke of the water tub is larger than or equal to 18 mm.

4. The eccentricity control method of the washing machine according to claim 3, wherein, the first control switch and the second control switch are mounted side by side in the base and are both mounted under an end of the control rod close to the base, the first control switch is arranged close to the end of the control rod, the first control switch and the second control switch are simultaneously switched on in a natural state of the water tub, and only the first control switch is switched off or both the first control switch and the second control switch are switched off when the water tub is in an eccentricity state.

5. The eccentricity control method of the washing machine according to claim 1, wherein, a middle part of the control rod is rotatably connected to the base, one end of the control rod is provided between a water tub and a shell of the washing machine for bearing an eccentric hit from the water tub, another end of the control rod in contact with the first control switch and the second control switch is for simultaneously switching on the first control switch and the second control switch in a natural state of the water tub, and switches off the first control switch and/or the second control switch in an eccentricity state of the water tub.

6. The eccentricity control method of the washing machine according to claim 5, wherein, the first control switch and the second control switch are mounted side by side in the base and are both mounted under an end of the control rod close to the base, the first control switch is arranged close to the end of the control rod, the first control switch and the second control switch are simultaneously switched on in the natural state, and only the first control switch is switched off or both the first control switch and the second control switch are switched off when the water tub is in the eccentricity state.

7. The eccentricity control method of the washing machine according to claim 3, wherein, the control rod comprises a control rod head and a control rod seat, the control rod head is disposed between the water tub and the shell of the washing machine for bearing the eccentricity hit from the water tub, the control rod seat in contact with the first control switch and the second control switch is for simultaneously switching on the first control switch and the second control switch in the natural state, and switches off the first control switch and/or the second control switch in the eccentricity state of the water tub.

8. The eccentricity control method of the washing machine according to claim 5, wherein, the control rod comprises a control rod head and a control rod seat, the control rod head is disposed between the water tub and the shell of the washing machine for bearing the eccentricity hit from the water tub, the control rod seat in contact with the first control switch and the second control switch is for simultaneously switching on the first control switch and the second control switch in the natural state, and switches off the first control switch and/or the second control switch in the eccentricity state of the water tub.

9. The eccentricity control method of the washing machine according to claim 3, wherein, a reset means for controlling a reset of the control rod is provided between the control rod and the base, the reset means is an elastic torsion spring or an elastic tension spring.

10. The eccentricity control method of the washing machine according to claim 5, wherein, a reset means for controlling a reset of the control rod is provided between the control rod and the base, the reset means is an elastic torsion spring or an elastic tension spring.

11. The eccentricity control method of the washing machine according to claim 1, wherein, the first control switch and the second control switch are mounted side by side in the base and are both mounted under an end of the control rod close to the base, the first control switch is arranged close to the end of the control rod, the first control switch and the second control switch are simultaneously switched on in a natural state of the water tub, and only the first control switch is switched off or both the first control switch and the second control switch are switched off when the water tub is in the eccentricity state.

12. The eccentricity control method of the washing machine according to claim 11, wherein, the first control switch and the second control switch are independently mounted side by side in the base, or the first control switch and the second control switch are integrated and mounted in the base, the first control switch has a first control button, the second control switch has a second control button, the first control button and the second control button are arranged side by side, the first control button is arranged close to the end of the control rod.

13. The eccentricity control method of the washing machine according to claim 1, wherein, the control rod comprises a control rod head and a control rod seat, the control rod head is disposed between the water tub and the shell of the washing machine for bearing the eccentricity hit from the water tub, the control rod seat in contact with the first control switch and the second control switch is for simultaneously switching on the first control switch and the second control switch in a natural state of the water tub, and switches off the first control switch and/or the second control switch in an eccentricity state of the water tub.

14. The eccentricity control method of the washing machine according to claim 13, wherein, the control rod is set as "L" shape, a vertical part of the "L" shape is the control rod head and a horizontal part is the control rod seat, a connection part of the control rod head and the control rod seat is rotatably connected to the base through a rotating shaft, the first control switch and the second control switch are mounted side by side under the control rod seat and the first control switch is arranged close to the end of the control rod seat.

15. The eccentricity control method of the washing machine according to claim 1, wherein, a reset means for controlling a reset of the control rod is provided between the control rod and the base, the reset means is an elastic torsion spring or an elastic tension spring.

* * * * *